(12) United States Patent
Atkin et al.

(10) Patent No.: US 6,490,547 B1
(45) Date of Patent: Dec. 3, 2002

(54) JUST IN TIME LOCALIZATION

(75) Inventors: Steven Edward Atkin, Palm Bay, FL (US); Kenneth Wayne Borgendale, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,412

(22) Filed: Dec. 7, 1999

(51) Int. Cl.$^7$ .......................... G06F 17/28; G06F 17/20
(52) U.S. Cl. .............................. 704/8; 707/536; 704/3
(58) Field of Search .................. 704/8, 1, 10; 707/536; 345/334, 340, 171, 763, 764; 717/1, 2, 7

(56) References Cited

U.S. PATENT DOCUMENTS

| | | | | |
|---|---|---|---|---|
| 5,583,761 A | * | 12/1996 | Chou | 704/8 |
| 5,652,884 A | * | 7/1997 | Palevich | 707/100 |
| 5,907,326 A | * | 5/1999 | Atkin et al. | 345/334 |
| 5,974,372 A | * | 10/1999 | Barnes et al. | 704/8 |
| 6,334,101 B1 | * | 12/2001 | Hetherington et al. | 704/8 |

OTHER PUBLICATIONS

Web Based User Interface Construction Method, U.S. Patent Application Ser. No. 09/161,073.

* cited by examiner

*Primary Examiner*—Patrick N. Edouard
(74) *Attorney, Agent, or Firm*—Marilyn Smith Dawkins; Bracewell & Patterson, L.L.P.

(57) ABSTRACT

User interface text for dialog boxes, menus, and the like is "localized" with respect to human languages is achieved at run time by transmitting a translation request containing a text string to be translated, an identification of the source language, and an identification of the target language to a Web server providing text string translation services. The response from the Web server contains the translated text string, which is employed by the user application within the user interface. Text strings for all of the user interfaces of a particular user application may be translated in this fashion as a group at the time an unsupported human language is first requested, or text strings may simply be translated on-the-fly during operation of the underlying user application on an as-needed basis. the translated text strings may be preserved locally for future use, until a translation of the user interface text to the requested human language is provided by the user application developer. In a preferred embodiment, an extension of the Java ResourceBundles class is utilized to support run-time human language translation of user interface text. The new class, JILResourceBundle, obtains the translation of the user interface text strings when an unsupported language is requested, and may be inserted into a Java Application Resource file placed within the user's classpath to avoid the necessity of rewriting the underlying user application in order to utilize the new class.

20 Claims, 3 Drawing Sheets

JUST IN TIME LOCALIZATION

BACKGROUND OF THE INVENTION

1. Technical Field

The present invention generally relates to providing human language translations of user application text and in particular to "localizing" the human language aspects of a user application. Still more particularly, the present invention relates to providing human language translation of user application text at run time.

2. Description of the Related Art

When applications are delivered to the marketplace, it would be desirable to have all languages which any customer might utilize supported for user interface dialogs, menu items, etc. That is, a given application should preferably be available in all of the various languages which are utilized by the customer base for that application (e.g., English, French, German, and the like). However, human language translations of the software user interface text are typically the last step to be performed and may result in the delay of product manufacture. Usually developers prefer to enter critical markets as soon as possible with a new product release, and the delay associated with preparing human language translations is unacceptable. Further complicating the problem are the costs associated with multiple mass-publication runs for storing the product on distributable media such as CD-ROMS. Generally a single run with all versions is preferred to multiple discrete production runs for each human language version of a product.

As a result, conventional practice currently involves release of the product without the full repertoire of human language versions, followed by subsequent upgrades or updates for specific languages. Currently, translations introduced after the product has been shipped are typically delivered as a patch rather than a component of the product. Furthermore, all desired languages must either be selected during installation of the software product on a particular system and then updated or added by reinstallation, or all languages must be loaded onto a system, taking up storage space even if never needed. The conventional mechanism for distributing human language translations of a software product also does not lend itself to changes to the language files after delivery for fixes, corrections, or updates.

Unfortunately, the cost of universal support for different dialog and user interface languages-both in monetary terms and in terms of time-to-market delays-is prohibitively expensive. A developer may not know whether certain human language versions (e.g., Russian, Chinese, etc.) will be necessary until long after the initial release date. Moreover, the market for "fringe" languages (e.g., Serbian or Balinese) may not justify the expense of human language translation for the user application text.

It would be desirable, therefore, to provide a mechanism for providing after-market human language translation of user interface text dynamically at run time. It would further be advantageous if the mechanism provided support for a wide array of languages dynamically selected at run time and without the need for modification of the application.

SUMMARY OF THE INVENTION

It is therefore one object of the present invention to provide a method, system, and computer program product for performing human language translations of user application text.

It is another object of the present invention to provide a method, system, and computer program product for "localizing" the human language aspects of a user application.

It is yet another object of the present invention to providing human language translation of user application text at run time.

The foregoing objects are achieved as is now described. User interface text for dialog boxes, menus, and the like is "localized" with respect to human languages is achieved at run time by transmitting a translation request containing a text string to be translated, an identification of the source language, and an identification of the target language to a Web server providing text string translation services. The response from the Web server contains the translated text string, which is employed by the user application within the user interface. Text strings for all of the user interfaces of a particular user application may be translated in this fashion as a group at the time an unsupported human language is first requested, or text strings may simply be translated on-the-fly during operation of the underlying user application on an as-needed basis. The translated text strings may be preserved locally for future use, until a translation of the user interface text to the requested human language is provided by the user application developer. In a preferred embodiment, an extension of the Java ResourceBundles class is utilized to support run-time human language translation of user interface text. The new class, JILResourceBundle, obtains the translation of the user interface text strings when an unsupported language is requested, and may be inserted into a Java Application Resource file placed within the user's classpath to avoid the necessity of rewriting the underlying user application in order to utilize the new class.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
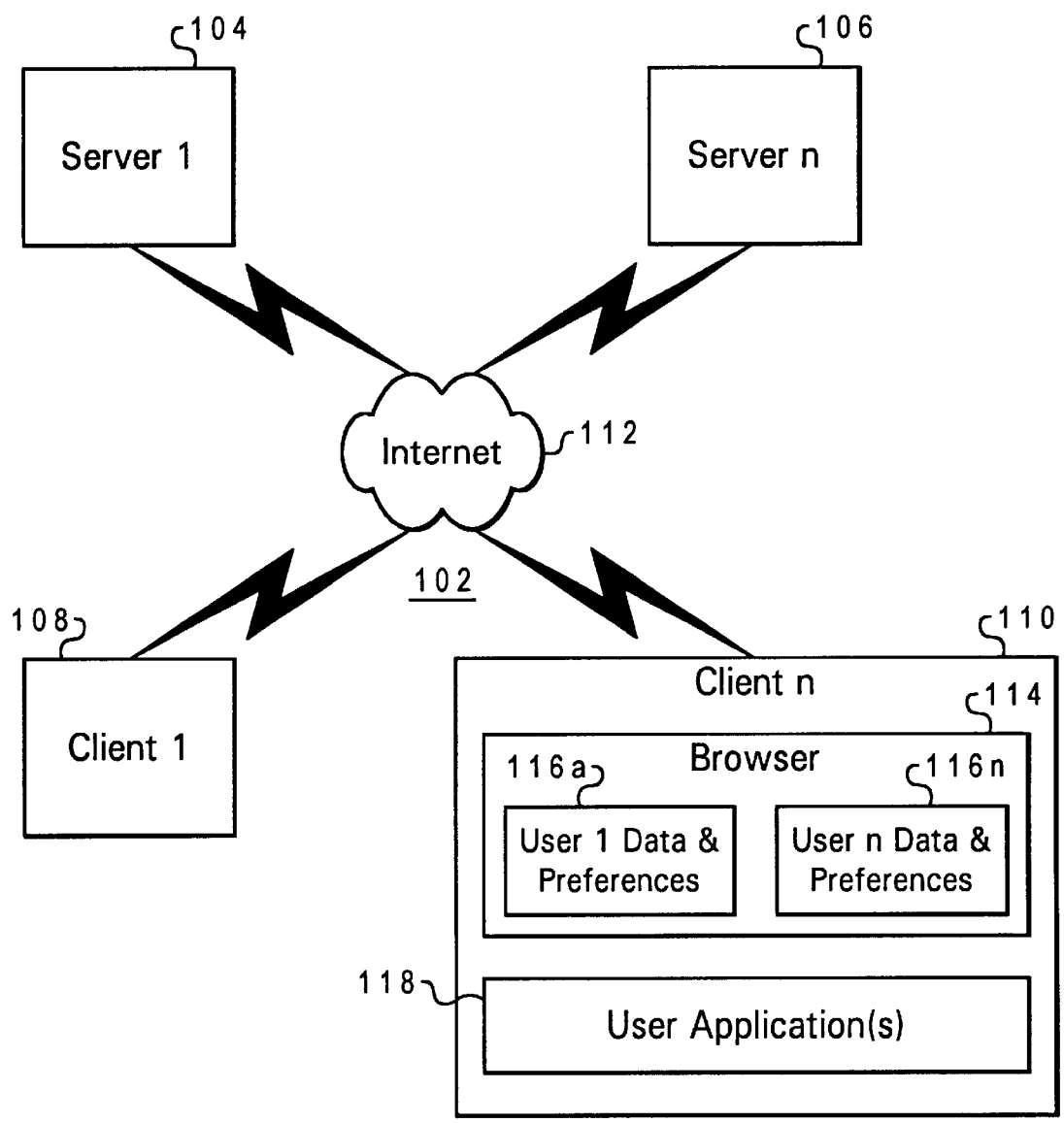
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes one or more of servers 104–106 and one or more clients 108–110. Servers 104–106 and clients 108–110 exchange data, such as HyperText Transmission Protocol (HTTP) requests and responses or HyperText Markup Language (HTML) data and accompanying graphical image or sound data, through the Internet 112 in accordance with the known art, utilizing, for example, the Transmission Convergence Protocol/Internet Protocol (TCP/IP) for data transfers.

Clients within data processing system network 102, such as client 110, include a browser application 114 for requesting data from servers 104–106, typically through HTTP requests. Browser application 114, which may be, for instance Netscape Navigator or Internet Explorer, may support multiple users. Accordingly, browser application 114 may utilize multiple sets of user data 116a–116n, each corresponding to a different user. User data 116a–116n may include, for example, user preferences for the display of browser application 114, historical data identifying the Uniform Resource Locators (URLs) of data (or "pages") retrieved by a particular user through browser application 114, or cache data for pages previously retrieved by the user utilizing browser application 114.

Client 110 may execute one or more user applications 118, either within browser application 114 or apart from browser application 114, which are capable of retrieval of data over Internet 112 from servers 104 or 106. Such user application(s) 118 include the mechanism described below for run-time human language translation of user interface text strings.

Figure 2:
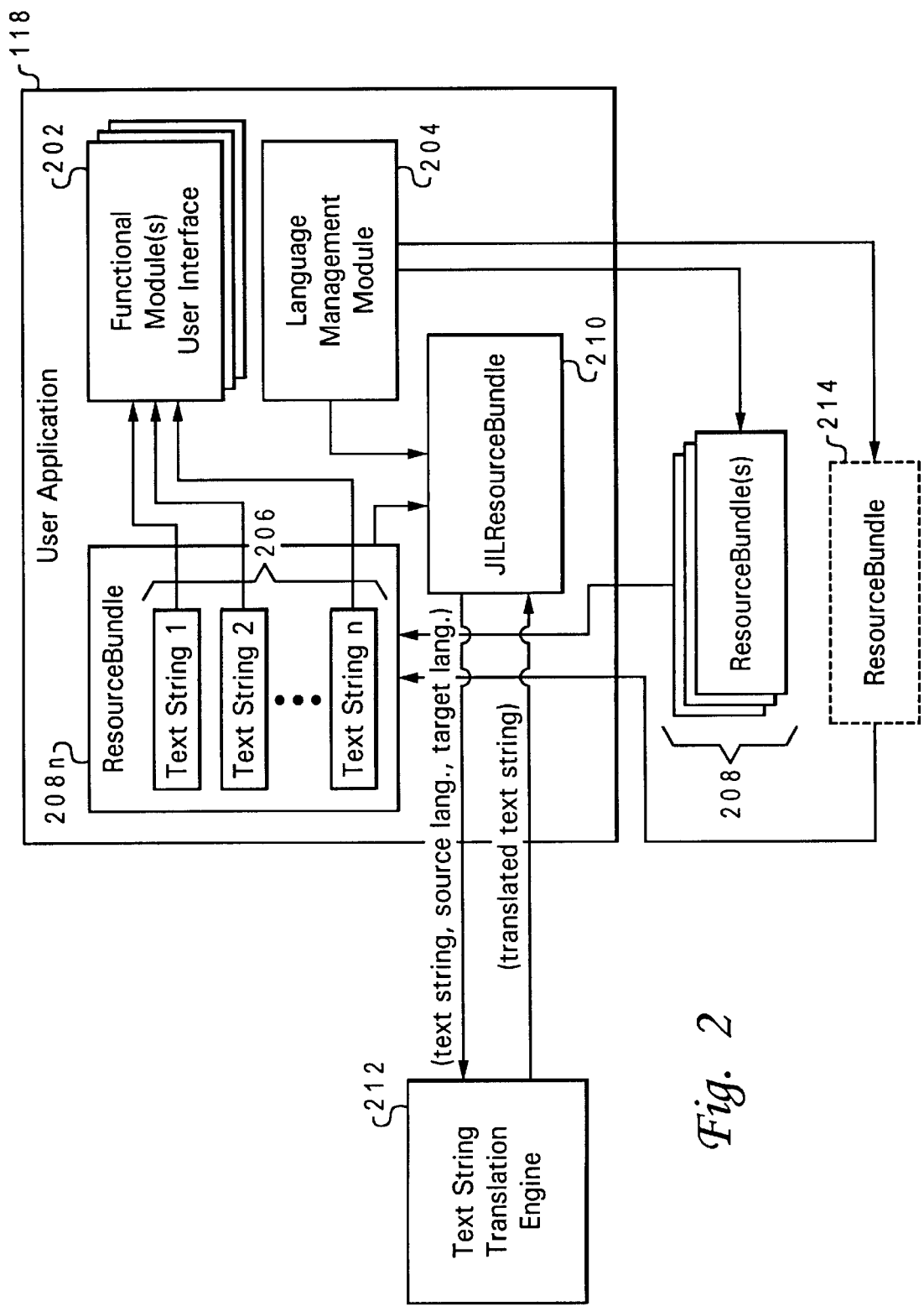
FIG. 2 is a block diagram of a mechanism for run-time human language translation of user interface text strings in accordance with a preferred embodiment of the present invention.

Referring to FIG. 2, a block diagram of a mechanism for run-time human language translation of user interface text strings in accordance with a preferred embodiment of the present invention is illustrated. User application 118 executes within a system in a data processing system network such as that depicted in FIG. 1, either within a client system, loaded from a storage device within the client or from a server, or within a server system generating HTML displays for a client system. User application 118 includes a number of functional modules 202 with user interfaces including text strings in dialog boxes, pull-down menus, and the like, and a language manager module 204 for selecting a human language in which the text strings are to be displayed. The user employs language manager module 204 to select the language in which text strings 206 for user application 118 are to be displayed within the user interfaces for functional modules 202.

User application 118 is preferably implemented as a Java program, and thus may take advantage of Java classes allowing resources to be dynamically loaded, such as PropertyResourceBundles and ListResourceBundles, which are accessed through the ResourceBundle class. In the present invention, text strings 206 for user application 118 are implemented within a ResourceBundle 208, with different human languages being supported by different ResourceBundles 208. When a user selects a particular human language for user application 118, language manager module 204 causes the appropriate ResourceBundle 208n to be loaded. Functional modules 202 the n draw text strings 206 for the user interface from the loaded ResourceBundle 208n.

In order to provide automatic human language translation of text strings at run time, the present invention extends the ResourceBundle class to provide a new type of ResourceBundle called JILResourceBundle in the exemplary embodiment. When a user requests a human language not supported by ResourceBundles 208 (i.e., a human language for which no translation of the user interface text strings is included in ResourceBundles 208), language manager 204 notifies JILResourceBundle 210, identifying the requested language. JILResourceBundle 210 then selects a default ResourceBundle 208n, containing the predefined "default" human language text strings for the user interface, and translates the user interface text strings.

JILResourceBundle 210 translates the user interface text strings from the applications "default" language into the request human language utilizing a Web server 212 which includes a translation engine providing translation of text strings among human languages. Several such sites exist, each currently using the translation engine produced by Systran Software Inc, accessible at www.systransoft.com. Other sites providing translation services utilizing that translation engine include:

babelfish.altavista.com/
translator.go.com
www.dictionary.com/translate/

In the exemplary embodiment, JILResourceBundle 210 transmits to server 212 an HTTP message for each user interface text string requiring translation (i.e., all text strings within the "default" ResourceBundle 208) containing the text string (as a Unicode string, for example) to be translated, an identification of the source language, and an identification of the target language. JILResourceBundle 210 may either translate all user interface text strings for user interfaces of user application 118 at the time the human language not supported by ResourceBundles 208 is requested, or may translate individual text strings for specific user interface displays of user application 118 on an as-needed basis.

The response from server 212 to the translation request by JILResourceBundle 210 contains the translated text string in the requested human language, which is passed to ResourceBundle 208n, which in turn delivers the translated text string to user application 118 for display in the user interface. JILResourceBundle 210 may create a separate ResourceBundle 214 for the translated text strings, for repeated use by user application 118. ResourceBundle 214, and other ResourceBundles similarly created from translations obtained using server 212, may be distinguished from ResourceBundles 208 containing translations from the developer of user application 118 for the purposes of later replacing ResourceBundle 214 with a translation made available from the developer.

With the present invention, an application need not be rewritten to take advantage of JILResourceBundles. By inserting the new implementation of ResourceBundle (i.e., JILResourceBundle) in a Java Application Resource (JAR) file, which is then placed in the user's classpath, the user application may be completely unaware of the location of the resources employed to translate human language text strings. The present invention need not, however, be implemented in Java, but may utilize any programming language or platform which supports loading resources at run time.

Figure 3:
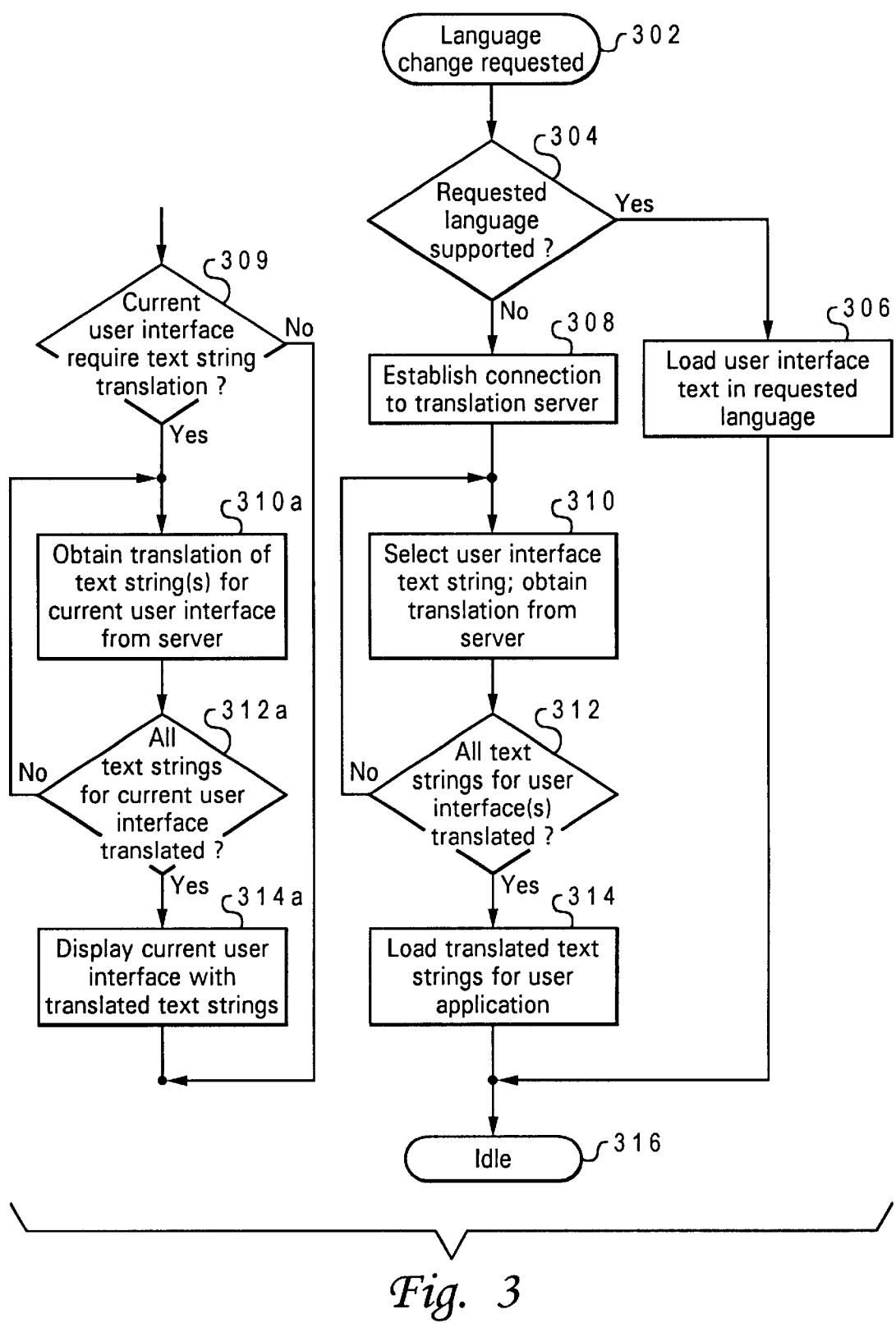
FIG. 3 is a high level flowchart for a process of dynamically providing human language translations of user interface text strings at run-time in accordance with a preferred embodiment of the present invention.

With reference now to FIG. 3, a high level flowchart for a process of dynamically providing human language translations of user interface text strings at run-time in accordance with a preferred embodiment of the present invention is depicted. The process begins at step 302, which depicts a user requesting a change in the human language in which user interface text is displayed. The process then passes to step 304, which illustrates a determination of whether the language requested by the user is supported by the user application (e.g., whether a ResourceBundle containing the user interface text in the requested language can be located).

If the requested language is supported by the user application, the process proceeds to step 306, which depicts loading the user interface(s) for the user application with the text in the human language requested by the user. If the requested language is not supported by a local translation of the user interface text, however, the process proceeds instead to step 308, which illustrates establishing a connection to a translation server providing human language translations of text strings.

The process then passes to step 310, which depicts selecting a user interface text string and obtaining a translation of that text string by sending the text string to the translation server with an identification of the source language and the desired or "target" language, and receiving the translated text string back from the translation server. The process passes next to step 312, which illustrates a determination of whether all text strings for the user interface(s) of the user application have been translated into the requested language. If not, the process returns to step 310 for selection and translation of another text string. If all text strings have been translated, however, the process proceeds instead to step 314, which depicts loading the translated text strings for display in the user interfaces of the user application, and then passes to step 316, which illustrates the process becoming idle until another language change is requested by the user.

As noted above, the user interface text strings may be translated as a group or individually on an as-needed basis.

Accordingly, an alternative to steps 310, 312, and 314 depicted in FIG. 3 and described above is to employ steps 309, 310a, 312a, and 314a. Step 309 illustrates determining whether a current user interface for the user application requires translation of any text strings. If not, the process simply passes to step 316. If so, however, the process proceeds instead to step 310a, which depicts obtaining translation(s) of any text string(s) within the current user interface from the translation server. The process then passes to step 312a, which illustrates a determination of whether all text strings for the current user interface have been translated, and returns to step 310a if any text strings remain to be translated. Once all text strings for the current user interface have been translated, the process proceeds to step 314a, which depicts displaying the current user interface of the user application with the translated text strings. The process then passes to step 316.

The present invention may be employed to support "fringe" languages, for which translation would not otherwise provide a sufficient return on investment to justify the production costs of the translation. A usable translation is provided by the translation engines, which are particularly proficient at translating computer terminology. However, the present invention need not replace traditional packaging of translation for key languages, merely augment the languages in which the user interface of an application may be displayed.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of providing human language translations of user interface text, comprising:

determining whether user interface text for a user application is available in a requested language from storage containing the user application; and responsive to determining that the user interface text is not available in the requested language from the storage containing the user application, sending a translation request including a user interface text input parameter, a source language input parameter, and a requested language input parameter to a translation server, and obtaining a translation of the user interface text input parameter to the requested language from the translation server.

2. The method of claim 1, further comprising:

responsive to determining that the user interface text is not available in the requested language from the storage containing the user application, establishing an Internet connection to a Web server providing translation of text strings from a first human language to a second human language, wherein identification of the first human language is the source language input parameter and identification of the second human language is the requested language input parameter.

3. The method of claim 1, wherein the step of obtaining a translation of the user interface text input parameter to the requested language from the translation server further comprises:

selecting a text string from the user interface text;

transmitting the selected text string as the user interface text input parameter to the translation server with au identification of a source human language in the form of the source language input parameter and an identification of a requested human language in the form of the requested language input parameter; and receiving a text string translated from the source human language to the requested human language from the translation server.

4. The method of claim 3, further comprising:

repeating the steps of selecting a text string, transmitting the selected text string, and receiving a translated text string until all text strings for the user interface text have been translated.

5. The method of claim 1, wherein the step of obtaining a translation of the user interface text input parameter to the requested language from the translation server farther comprises;

obtaining a translation for items of the user interface text for the user application as needed for a user interface display.

6. The method of claim 1, wherein the step of obtaining a translation of the user interface text input parameter to the requested language from the translation server further comprises:

obtaining a translation of the user interface text from a default language to the requested language for the user application as needed for a user interface display.

7. The method of claim 1, wherein the step of obtaining a translation of the user interface text input parameter to the requested language from the translation server further comprises:

loading a Java resource bundle containing the user interface text in a default language, and
(a) transmitting a text string from the user interface text within the loaded java resource bundle to the translation server, and
(b) receiving a translation of the transmitted text sting to the requested language from the translation server; and repeating steps (a) and (b) for each text string within the user interface text.

8. The method of claim 1, further comprising:

storing the user interface text string in each available language within a Java resource bundle, and means for receiving a translated text string from the translation server.

9. A system for providing human language translations of user interface text, comprising:

a system executing a user application;

a translation server accessible to the system;

means for determining whether user interface text for the user application is available in a requested language from storage containing the user application; and means, responsive to determining that the user interface text is not available in the requested language from the storage containing the user application,
for sending a translation request including a user interface text input parameter, a source language input parameter, and a requested language input parameter to the translation server, and
for obtaining a translation of the user interface text input parameter to the requested language from the translation server.

10. The system of claim 9, further comprising:

means, responsive to determining that the user interface text is not available in the requested language from the storage containing the user application, for establishing an Internet connection to a Web server providing translation of text strings from a first human language to a second human language, wherein identification of the first human language is the source language input parameter and identification of the second human language is the requested language input parameter.

11. The system of claim 9, wherein the means for obtaining a translation of the user interface text input parameter to the requested language from the translation server further comprises:

means for selecting a text string from the user interface text;

means for transmitting the selected text string as the user interface text input parameter to the translation server with an identification of a source human language in the form of the source language input parameter and an identification of a requested human language in the form of the requested language input parameter, and means for receiving a text string translated from the source human language to the requested human language from the translation server.

12. The system of claim 11, further comprising:

means for repeatedly selecting a text string, transmitting the selected text string, and receiving a translated text string until all text strings for the user interface text have been translated.

13. The system of claim 9, wherein the means for obtaining a translation of the user interface text input parameter to the requested language from the translation server further comprises:

means for obtaining a translation for items of the user interface text for the user application as needed for a user interface display.

14. The system of claim 9, wherein the means for obtaining a translation of the user interface text input parameter to the requested language from the translation server further comprises:

means for obtaining a translation of the user interface text from a default language to the requested language for the user application as needed for a user interface display.

15. A computer program product within a computer usable medium for providing human language translations of user interface text, comprising:

instructions for determining whether user interface text for the user application is available in a requested language from storage contains the user application; and instructions, responsive to determine that the user interface text is not available in the requested language from the storage containing the user application,
for sending a translation request including a user interface text input parameter, a source language input parameter, and a requested language input parameter to the translation server, and
for obtaining a translation of the user interface text input parameter to the requested language from the translation server.

16. The computer program product of claim 15, further comprising:

instructions, responsive to determining that the user interface text is not available in the requested language from the storage containing the user application, for establishing an Internet connection to a Web server providing translation of text strings from a first human language to a second human language, wherein identification of the first human language is the source language input parameter and identification of the second human language is the requested language input parameter.

17. The computer program product of claim 15, wherein the instructions for obtaining a translation of the user interface text input parameter to the requested language from the translation server further comprise:

instructions for selecting a text string from the user interface text;

instructions for transmitting the selected text string as the user interface input parameter to the translation server with an identification of a source human language in the form of the source language input parameter and an identification of a requested human language in the form of the requested language input parameter; and instructions for receiving a text string translated from the source human language to the requested human language from the translation server.

18. The computer program product of claim 17, further comprising:

instructions for repeatedly selecting a text string, transmitting the selected text string, and receiving a translated text string until all text strings for the user interface text have been translated.

19. The computer program product of claim 15, wherein the instructions for obtaining a translation of the user interface text input parameter to the requested language from the translation server further comprise:

instructions for obtaining a translation for items of the user interface text for the user application as needed for a user interface display.

20. The computer program product of claim 15, wherein the instructions for obtaining a translation of the user interface text input parameter to the requested language from the translation server further comprise:

instructions for obtaining a translation of the user interface text from a default language to the requested language for the user application as needed for a user interface display.

\* \* \* \* \*

UNITED STATES PATENT AND TRADEMARK OFFICE
CERTIFICATE OF CORRECTION

PATENT NO. : 6,490,547 B1
DATED : December 3, 2002
INVENTOR(S) : Atkin et al.

It is certified that error appears in the above-identified patent and that said Letters Patent is hereby corrected as shown below:

Title page, Item [54] and Column 1, line 1,
Please delete the title: "JUST IN TIME LOCALIZATION" and replace with
-- LOCALIZED HUMAN LANGUAGE SOFTWARE SUPPORT --

Title page,
Item [57], ABSTRACT,
Line 14, please replace "the translated text strings may be preserved...." with -- The translated text strings may be preserved.... --

Column 1,
Line 29, please insert -- production -- between the words "single" and "run".

Column 6,
Line 37, please replace "au" with -- an --.
Line 52, please replace "farther" with -- further --.

Column 7,
Line 6, please replace "text sting" with -- text string --.
Lines 11-15, please delete claim 8 and replace with:
-- 8. The method of claim 1, further comprising:
storing the user interface text string in each available language
  within a Java resource bundle. --

Signed and Sealed this

Fifth Day of August, 2003

JAMES E. ROGAN
*Director of the United States Patent and Trademark Office*